May 14, 1968 W. K. SQUIRES 3,383,601

MIXER CIRCUIT EMPLOYING LINEAR RESISTIVE ELEMENTS

Filed May 17, 1967

INVENTOR
*William K. Squires*

BY *Schlesinger, Arkwright & Garvey*

ATTORNEYS

United States Patent Office 3,383,601

Patented May 14, 1968

3,383,601

MIXER CIRCUIT EMPLOYING LINEAR RESISTIVE ELEMENTS

William K. Squires, 1 Washington Ave., Martinsville, N.J. 08836

Filed May 17, 1967, Ser. No. 639,231
10 Claims. (Cl. 325—450)

ABSTRACT OF THE DISCLOSURE

The mixer circuit employs a pair of linear and variable resistive elements, such as field effect transistors, connected one at each end of the primary coil of an intermediate frequency transformer. The radio frequency signal is applied to the center tap of the primary coil while the oscillator signal is applied to the variable resistive elements to alternately change their resistance. The linear resistive portion of the characteristics is thereby switched by local oscillator voltage to produce a variation in channel resistance at the local oscillator frequency. When signal current flows in this time varying resistance, the resultant voltage is a linear product of the two applied time-varying functions, and contains components at the sum and difference frequencies.

This invention relates to radio receivers and more particularly to a mixing circuit for a radio receiver.

The principal object of this invention is to provide a mixer circuit which has much wider dynamic range than currently attainable in tube or transistor circuits. The circuit makes use of a switch technique controlled by an oscillation frequency for achieving mixing of an incoming radio signal applied to the primary coil of an intermediate frequency transformer.

The incoming radio signal is applied to the center tap of the intermediate frequency transformer primary coil. Each end of this coil is connected to ground through a special type field effect transistor which acts as an oscillator controlled variable resistance to provide or block a conductive path from the intermediate frequency primary coil to ground. The drain-source characteristic curves of these transistors must be linear for a major portion thereof and should pass through the origin and extend for a considerable distance in both the first and third quadrants.

The transistors are alternately made conducting by applying an oscillator signal to their gates. The gates are connected to opposite ends of the secondary coil of the oscillator coupling transformer and supply opposite polarity signals of the same frequency to each of the gates. This results in a switching action at the oscillator frequency between each end of the intermediate frequency transformer primary coil and ground.

Accordingly, it is an object of this invention to provide a new type of mixer circuit for a radio receiver having very wide dynamic range.

A still further object of this invention is to provide a mixing circuit using elements having linear characteristic curves which extend from the first quadrant through the origin and down through the third quadrant.

A still further object of this invention is to eliminate the need for supplying a large amount of power to maintain such elements in a positive linear first quadrant operating region of the characteristic curve.

A still further object of this invention is to outperform parametric converters by substantially reducing oscillator radiation. Parametric converters require the local oscillator power to exceed the maximum signal power to remain linear and this creates an oscillator radiation problem.

A further object of this invention is to provide a circuit which is inherently balanced against local oscillator radiation.

A further object of this invention is to provide a mixing circuit which requires only minute amounts of power to operate.

A further object of this invention is to provide a mixing circuit superior to parametric converter circuits. Such circuits require several tuned circuits and careful adjustment to operate.

A further object of this invention is to provide a mixing circuit which is not restricted to upper side band operation as conventional parametric converters which require that the intermediate frequency must be much higher than the signal frequency. This operation requires more difficult and expensive filtering than lower sideband operation.

It is a further object of this invention to eliminate the requirement of a radio frequency stage. Transistor circuits require such a stage to achieve good noise performance.

It is a further object of this invention to use a circuit which permits the inclusion of the entire "front end" of the receiver, exclusive of tuned circuits, on integrated circuit chips. This is not possible with transistor mixers and parametric converters which require large power input to the circuit.

A further object of this invention is to use very small local oscillator power as contrasted to parametric upconverters which require the local oscillator power to exceed the maximum signal power to remain linear.

Further objects and advantages of the invention reside in the details of construction, arrangement, combination of the various parts of the apparatus hereinafter more fully set forth, and as specifically pointed out in the claims, and illustrated in the accompanying drawing, in which:

Figure 1:
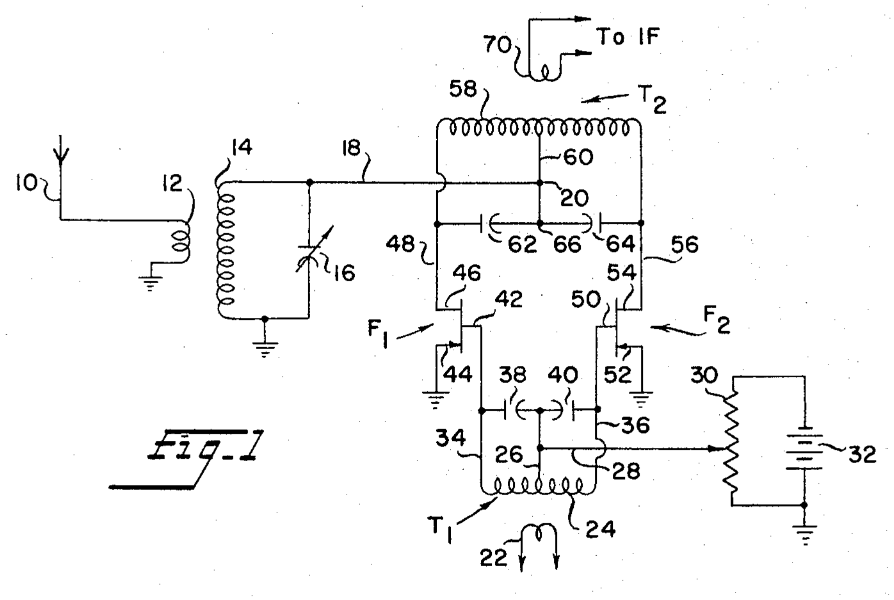
FIGURE 1 shows a detailed arrangement of the preferred embodiment of the invention using field effect transistors as elements in the circuit.

Referring particularly to the drawings, FIGURE 1 shows a receiving antenna 10 which picks up the incoming radio frequency. This signal is impressed across primary coil 12 of the antenna coupling transformer. The secondary coil 14 together with the variable capacitor 16 forms a tuned circuit through which the signal is transmitted by conductor 18 to the junction 20 of the mixer circuit.

The mixer circuit is supplied with an oscillator signal through primary coil 22 of the balanced transformer $T_1$. The secondary coil 24 has a center tap 26 which is connected through conductor 28 to adjustable resistor 30 and source 32 to provide bias adjustment. Depending on the particular type of field effect transistor (F.E.T.) used, this bias adjustment may be deleted.

One end of the secondary coil 24 is connected to conductor 34 and the other end to conductor 36 which are respectively connected to the gates of field effect transistors $F_1$ and $F_2$. Balance is effected by use of capacitors 38 and 40 which are connected to conductor 26. The oscillator signals applied through conductors 34 and 36 act to alternately switch on and off the current flow through the field effect transistors $F_1$ and $F_2$.

The oscillator signal from conductor 34 is supplied to the gate 42 of field effect transistor $F_1$ and controls the resistance from source 44 to drain 46 thereby providing a component of I.F. voltage on line 48.

Similarly, the resistance between source 52 and drain 54 of field effect transistor $F_2$ is controlled by the voltage applied to gate 50 by conductor 36 to produce a voltage component at I.F. frequency on conductor 56.

The output of the field effect transistors $F_1$ and $F_2$ is connected to a balanced intermediate frequency transformer $T_2$. The secondary coil is connected to the intermediate frequency stage of the receiver.

The primary coil 58 of transformer $T_2$ is connected at one end to drain 46 of $F_1$ through conductor 48, and at its other end to the drain 54 of field effect transistor $F_2$ through conductor 56. The radio frequency signal from the antenna 10 is applied through conductor 18 to the center tap 60 of coil 58. Balance between conductors 48 and 56 is effected by capacitors 62 and 64 which are connected between these lines and point 66 on center tap 60. Alternatively, the connection to the C.T. of the coil 58 may be deleted and the capacitors 62 and 64 used alone if their reactance is small at signal frequency.

The primary coil 58 of the transformer $T_2$ receives the I.F. signals and couples them to secondary coil 70 which is connected to the intermediate frequency stages of the receiver.

It will be seen that the mixing of the radio frequency signal and the oscillating frequency signal takes place in the output section of the mixing circuit, and that there is complete isolation of both the radio signal and the oscillating signal.

Figures 2, 3, 4:
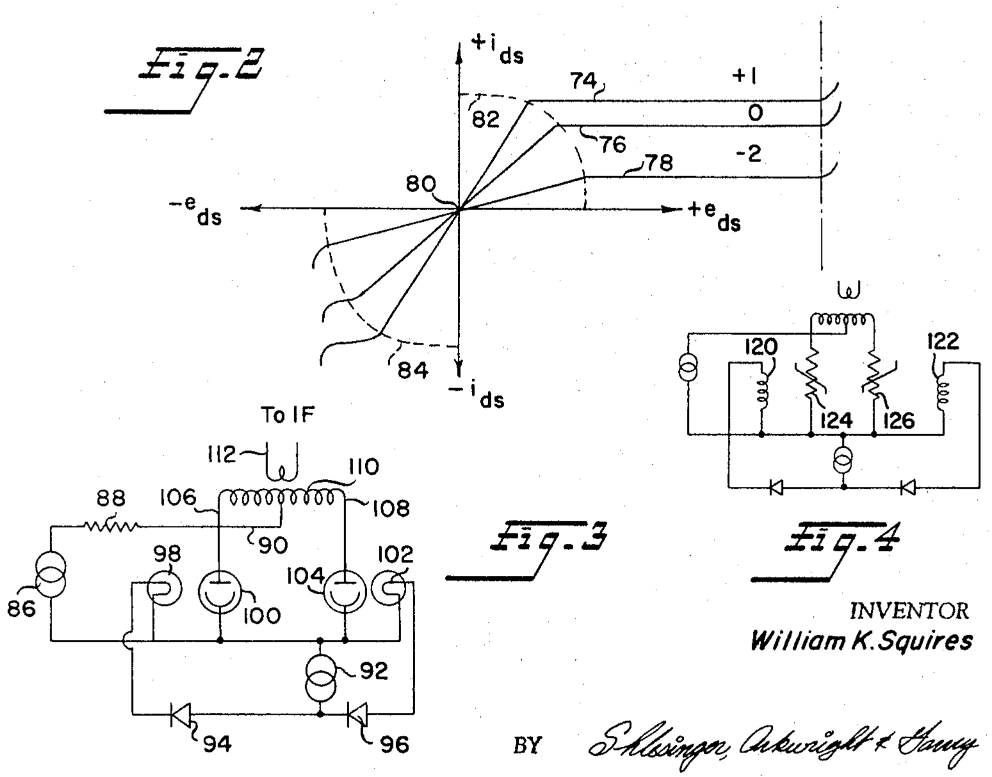
FIGURE 2 shows idealized characteristic curves for a typical field effect transistor used in this invention.
FIGURE 3 shows an equivalent circuit diagram using a pair of photo-conductive cells as the resistive switch elements.
FIGURE 4 shows an equivalent circuit diagram using a pair of magnetoresistive units as the resistive switching elements of the circuit.

FIGURE 2 shows drain-source characteristic curves for field effect transistors required for the circuit of this invention. It should be noted that the curves 74, 76 and 78 all pass through the origin 80, and extend into both the first and third quadrants. The curves 74, 76 and 78 show respectively voltage versus current curves for plus one, zero and minus two volts on axes of positive to negative current and voltage drain-source values. The linear region of operation extends from the origin in both positive and negative directions to the dotted lines 82 and 84. This invention takes advantage of this linear resistive characteristic to provide good switch action with very low distortion.

In the switching action, it is necessary that the elements operate in the linear region when conducting. Contrary to the requirements of either a vacuum tube or a conventional type transistor, which are linear for a portion of their characteristic curve which lies in the first quadrant, the field effect transistor used has linear characteristic curve portions which lie in the first and third quadrants on either side of the origin, and consequently it can operate with both positive and negative drain-source voltages, and does not require a DC bias to maintain the element at a given operating point in the first quadrant. This distinction is extremely important, since it makes possible use of an element that does not require a large DC power supply to keep it in the linear operating region. This type field effect transistor only requires a direct current power supply to establish a very small gate-source bias (fractions of a milliwatt), since the gate-source resistance of field effect transistors is large. Some types operate at zero bias and need no bias supply. The ratio of the transistor maximum to minimum drain-source resistance is substantially greater than 100.

In the mixer circuit there is balance from the signal input to the intermediate frequency output lines and from the oscillator input lines to the signal input lines. This arrangement precludes any signal frequency current in the intermediate frequency output circuit as well as preventing oscillator current from flowing in the signal frequency input circuit.

The mixer noise is very low, approaching that of a resistive attenuator whose attenuation is equal to the mixer conversion loss, and consequently no amplifier stage is required. Consequently the mixer can be directly connected to the antenna circuit. The above mixer circuit provides a very wide dynamic range with at least a hundred times improvement over conventional transistor mixers.

In this circuit configuration it is not necessary that the oscillator power exceed the maximum signal power to retain linearity. Therefore, this circuit uses small oscillator powers which considerably lessens the local oscillator radiation problem.

It is possible to miniaturize this circuit on integrated chips because of the small heat dissipation requirements, since very small amounts of direct current and local oscillator power are required for operation and consequently can be used in low drain miniaturized equipment. This is not possible with other type mixer circuits now in use.

For example, parametric mixer circuits require several tuned circuits and careful adjustment for proper operation and usually must be upper sideband mixers having a large ratio of oscillator frequency to signal frequency. This requires that the intermediate frequency be much higher than a signal frequency making intermediate frequency filters difficult to design and expensive. The described circuit may be used with an intermediate frequency either above or below the signal frequency, thereby requiring only simple tuned circuits.

The above mixer circuit has an advantage over ordinary transistor mixing circuits which require at least one radio frequency stage to permit front-end automatic gain control and to achieve good noise figures. The above circuit permits automatic gain control at the mixer itself by controlling the oscillator injection voltage and has a very low noise figure. Consequently, no radio frequency stage is required.

FIGURE 3 shows the equivalent circuit for a similar mixer configuration using a pair of matched photo-conductive cells which are activated by a light source. The signal at 86 is sent through resistor 88 and conductor 90 to the mixer circuit. The oscillator signal 92 is fed through diodes 94 and 96 to the light sources. Light source 98 activates the photo-conductive cell 100, and light source 102 activates photo-conductive cell 104. Both of these photo-conductive cells are connected to the primary coil of an intermediate frequency transformer. Conductors 106 and 108 are connected to the primary coil 110 of the intermediate frequency transformer. The incoming radio frequency signal is fed to the center tap of coil 110 through conductor 90, so that mixing of the oscillator and radio frequency signals takes place in the primary coil 110, with the resulting mixed signal being applied to the secondary coil 112 which is connected to the intermediate frequency stages of the receiver. The light sources may be Kerr cells used as modulators of a conventional lamp, or laser sources of light.

FIGURE 4 shows an equivalent circuit similar to that of FIGURE 3, using a magneto-resistive assembly in place of the photocell assembly of FIGURE 3. Modulating windings 120 and 122 respectively affect the resistance of magneto-resistive cells 124 and 126.

While the invention has been described, it will be understood that it is capable of further modifications and this application is intended to cover any variations, uses, or adaptations of the invention following in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention what I claim is:

1. A mixer circuit comprising:

(a) a pair of transistors each having a source, drain and gate terminal;

(b) said transistors having a characteristic curve which has a linear resistive section which passes through the origin of the current and voltage axes;

(c) said source terminals being connected to a constant voltage;

(d) means connected to both transistor gate terminals for simultaneously supplying an oscillator frequency signal to each gate terminal which is one hundred eighty degrees out of phase with the other gate terminal to alternately change the resistance of said transistors along the linear resistive portions of their characteristic curves;

(e) output circuit means interconnecting the drain terminals of said transistors;

(f) means for supplying an input frequency signal to said output circuit means whereby said oscillator and input frequencies are mixed at said output circuit means.

2. The mixer circuit as set forth in claim 1, wherein:

(a) said transistors are field effect transistors having high source to gate resistance.

3. A mixer circuit as set forth in claim 1, wherein:

(a) the amplitude of the input frequency signal is approximately the same as that of the oscillator signal.

4. A mixer circuit as set forth in claim 1, wherein:

(a) the ratio of the transistor maximum drain-source resistance to the transistor minimum resistance is substantially greater than one hundred.

5. A mixer circuit as set forth in claim 1, wherein:

(a) said means for supplying an oscillator frequency signal is a transformer which has a secondary coil connected at one end to the gate terminal of one of said transistors and at the other end to the gate terminal of the other of said transistors.

6. The mixer circuit as set forth in claim 1, wherein:

(a) said output circuit means is a balanced transformer having its primary coil connected at one end to the drain terminal of one of said transistors and the other end connected to the drain terminal of the other of said transistors; and (b) said means for supplying an input frequency signal is connected to the center tap of said primary coil.

7. The mixer circuit as set forth in claim 6, wherein:

(a) said means for supplying an input frequency signal is a tuned antenna circuit which is directly connected to the center tap of said primary coil.

8. A mixer circuit comprising:

(a) a pair of electrical conducting units having characteristic curves with a linear resistive section;

(b) a control element for each of said electrical conducting units which changes the electrical resistance of said conducting units;

(c) a balanced transformer having a primary coil connected at one end to the output of one of said electrical conducting units and the other end thereof connected to the output of the other of said electrical conducting units;

(d) means for supplying an oscillator frequency signal simultaneously to both said control elements, the signal supplied to one control element being one hundred eighty degrees out of phase with the signal supplied to the other control element to alternately increase and decrease the resistance of said electrical conducting units along the linear resistive section of their characteristic curves; and (e) input frequency signal means connected to a center tap on said primary coil so that said oscillator and input frequency signals are mixed.

9. The mixer circuit as set forth in claim 8, wherein:

(a) said electrical conducting units are photo-conductive cells; and (b) each of said control elements is a light source.

10. A mixer circuit as set forth in claim 8, wherein:

(a) said electrical conducting units are magneto-resistive cells; and (b) each of said control elements is a magneto-resistive cell modulating winding.

No references cited.

KATHLEEN H. CLAFFY, *Primary Examiner.*

R. S. BELL, *Assistant Examiner.*